United States Patent [19]

Schellhaass

[11] Patent Number: 5,750,166
[45] Date of Patent: May 12, 1998

[54] COMPOSITION AND METHOD FOR FLAVORING POPCORN PRODUCT

[75] Inventor: Steven R. Schellhaass, Plymouth, Minn.

[73] Assignee: Golden Valley Microwave Foods, Inc., Edina, Minn.

[21] Appl. No.: 711,732

[22] Filed: Aug. 29, 1996

[51] Int. Cl.$^6$ ........................................ A23L 1/36
[52] U.S. Cl. .................. 426/93; 426/629; 426/640; 426/650
[58] Field of Search ................ 426/93, 650, 629, 426/640

[56] References Cited

U.S. PATENT DOCUMENTS

| | | |
|---|---|---|
| 1,658,486 | 2/1928 | Howe . |
| 1,969,730 | 8/1934 | Daughters . |
| 2,222,560 | 11/1940 | Clickner . |
| 2,240,759 | 5/1941 | Chandler . |
| 2,475,133 | 7/1949 | Furter et al. . |
| 2,518,247 | 8/1950 | Nairn . |
| 2,604,407 | 7/1952 | Martin . |
| 2,648,610 | 8/1953 | Martin . |
| 2,673,806 | 3/1954 | Colman . |
| 2,702,246 | 2/1955 | Kinsella . |
| 2,843,080 | 7/1958 | Woodruff . |
| 3,102,032 | 8/1963 | Lippert . |
| 3,140,952 | 7/1964 | Cretors . |
| 3,341,331 | 9/1967 | Kimura et al. . |
| 3,341,336 | 9/1967 | Jokay . |
| 3,537,861 | 11/1970 | Schwarzkopf . |
| 3,556,815 | 1/1971 | Fujiwara . |
| 3,580,727 | 5/1971 | Gulstad . |
| 3,617,309 | 11/1971 | Rebane . |
| 3,689,291 | 9/1972 | Draper . |
| 3,704,133 | 11/1972 | Kracauer . |
| 3,783,820 | 1/1974 | Hautly et al. . |
| 3,830,941 | 8/1974 | Luft et al. . |
| 3,843,814 | 10/1974 | Grunewald-Kirstein . |
| 3,851,081 | 11/1974 | Epstein . |
| 3,851,574 | 12/1974 | Katz et al. . |
| 3,882,255 | 5/1975 | Gorham, Jr. et al. . |
| 3,961,091 | 6/1976 | Caccavale et al. . |
| 3,973,045 | 8/1976 | Brandberg et al. . |
| 4,038,425 | 7/1977 | Brandberg et al. . |
| 4,053,650 | 10/1977 | Chino et al. . |
| 4,096,281 | 6/1978 | Young et al. . |
| 4,156,742 | 5/1979 | Babcock et al. . |
| 4,163,066 | 7/1979 | Mason et al. . |
| 4,219,573 | 8/1980 | Borek . |
| 4,409,250 | 10/1983 | Van Hulle et al. . |
| 4,450,180 | 5/1984 | Watkins . |
| 4,548,826 | 10/1985 | Watkins . |
| 4,563,366 | 1/1986 | Barid et al. . |
| 4,640,842 | 2/1987 | May . |
| 4,691,374 | 9/1987 | Watkins et al. . |
| 4,735,811 | 4/1988 | Skarra et al. . |
| 4,767,635 | 8/1988 | Merritt et al. . |
| 4,849,233 | 7/1989 | Hemker . |
| 4,880,646 | 11/1989 | Lew et al. . |
| 4,956,193 | 9/1990 | Cain et al. . |
| 4,981,707 | 1/1991 | Morris . |
| 5,002,785 | 3/1991 | Lew . |
| 5,044,777 | 9/1991 | Watkins et al. . |
| 5,069,923 | 12/1991 | Hubbard et al. . |
| 5,108,772 | 4/1992 | Wilbur . |
| 5,132,125 | 7/1992 | Lew et al. . |
| 5,215,770 | 6/1993 | Aramouni . |
| 5,284,666 | 2/1994 | Graf . |
| 5,362,504 | 11/1994 | Kamper et al. ............ 426/93 |
| 5,443,858 | 8/1995 | Jensen et al. . |

FOREIGN PATENT DOCUMENTS

| | | |
|---|---|---|
| 2680082 | 12/1993 | France . |
| 3335781 | 11/1985 | Germany . |
| 62-244360 | 10/1987 | Japan . |
| 1027445 | 1/1989 | Japan . |

OTHER PUBLICATIONS

Iglesias et al., Handbook of Food Isotherms: Water Sorption Parameters for Food and Food Components, Academic Press Inc, New York, NY at pp. 86, 225–225 (1982) (no month/day indicated on copy of reference).

Minifie, "Physical Structure of the Confection", Chocolate, Cocoa and Confectionery: Science and Technology, The AVI Publishing Company, Inc., Westport, CT, at p. 464 (1980) (no month/day indicated on copy of reference).

Product Literature: "Product Formulation: Fat–Free Adhesion System for Snack Food Applications Using Kelsnax Gellan Gum Product", (1 page) The NutraSweet Kelco Company.

Product Literature: Product Formulation SS–6919 (2 pages) Merck & Co., Inc., Kelco Division, U.S.A.

Product Literature: "Redefining Glycerine Standards" (3 pages) Dow.

Courtesy Copy of Declaration of Aki Ishida, Translator of Japanese 62–244360. This Declaration was originally filed in U.S. SN 08/154,299, now U.S. Pat. No. 5,443,858, issued Aug. 22, 1995.

*Primary Examiner*—Helen Pratt
*Attorney, Agent, or Firm*—Merchant, Gould, Smith, Edell, Welter & Schmidt, P.A.

[57] ABSTRACT

A method of coating unpopped popcorn kernels for enhanced flavor impact is provided. According to one application, an aqueous-based adhesive composition is applied to unpopped popcorn kernels and a dry flavorant composition is added. Preferably, excessive moisture is dried from the kernels. A flavorant facilitator is then applied to provide enhanced flavor impact. A coated, unpopped popcorn product, capable of being popped in a microwave oven in the absence of added oil or fat to advantage, is also provided.

17 Claims, No Drawings

COMPOSITION AND METHOD FOR FLAVORING POPCORN PRODUCT

FIELD OF THE INVENTION

The present invention relates to compositions and methods for flavoring "puffed" products, for example, popped popcorn. Methods described herein can be used to prepare flavored kernels which can be popped by such methods as microwave heating, to generate a flavored popcorn product.

BACKGROUND OF THE INVENTION

The present disclosure relates to popcorn flavoring. While the disclosure discusses popcorn as a typical example of a product of the invention, the invention is also applicable to a variety of products produced by puffing or popping seed grains or kernels.

I. Flavored, Unpopped Popcorn Products

Freshly popped popcorn is a popular consumer item. Such products are typically popcorn sold in the form of unpopped kernels, which are popped by the consumer.

In general, there have been developed two principal methods of flavoring such popcorn. The first is the addition of flavoring after the popcorn is popped. For example, consumers often add butter and salt to freshly popped popcorn to provide desirable flavor, aroma or color.

A second method is to provide flavorings or other materials mixed with the unpopped kernels, so that during the popping process the kernels are provided with flavor (or color, etc.). Such methods typically require control of the components in the flavoring mixture, to avoid undesirable burning or scorching during the popping process.

In general, techniques for providing flavorings mixed with the popcorn (prior to popping) have developed in part with specific focus on the method to be utilized by the consumer to cause popping. That is, the demands of the environments provided by alternate methods of popping, such as hot-air poppers, conventional heated popcorn poppers with oil/fat, or microwave systems, have to some extent dictated different needs or requirements in the flavoring compositions.

In some conventional popcorn poppers, popcorn kernels are mixed in with oil/fat used during the popping process. During the popping process, the oil/fat will tend to splash over the popping popcorn. In some systems, this has been a particularly convenient method for providing some flavoring to the popcorn. It can also provide a good mouth feel, color and aroma.

Some conventional microwave popcorn systems have utilized similar principles. That is, the popcorn is packaged with a salt flavoring that is mixed with an added oil/fat material. When the package is placed in a microwave oven, the popcorn is popped in the presence of the oil/fat, which becomes distributed over the popcorn. Such a system is described, for example, in U.S. Pat. No. 3,704,133, the disclosure of which is incorporated herein by reference. A system which utilizes a film former in conjunction with an oil/fat to coat the popped popcorn with a flavoring material is described in U.S. Pat. No. 3,851,574, incorporated herein by reference.

In recent years, consumer focus has turned to preferences for "light", "low fat", "no fat" or similar food products. In many instances, consumers prefer to prepare their foods by means other than through the utilization of substantial amounts of oil/fat in the preparation process. Hot-air poppers, which do not utilize substantial amounts of oil/fat in the popping process, have enjoyed some popularity. However, in general, the provision of desirable flavor resulting from the popping process, rather than from materials added after the popping process, has been a problem.

One method developed to approach this is presented in U.S. Pat. No. 4,767,635, the disclosure of which is incorporated herein by reference. According to that disclosure, the unpopped kernels are provided with a film or coating having some flavoring material retained therein. According to the reference, during a popping process, a portion of the film retains some of the flavoring on residual hulls of the kernels.

With respect to microwavable popcorn products, Golden Valley Microwave Foods, the assignee of the present application, has developed systems for providing flavored microwavable popcorn kernels, and ultimately a microwave popped flavored popcorn product, in the absence of added oil/fat. Techniques with respect to this are described in U.S. Ser. No. 08/198,892, now abandoned, the disclosure of which is incorporated herein by reference. A further description of products from such processing are described in U.S. Ser. No. 08/391,437, filed Feb. 21, 1995, now abandoned, also owned by Golden Valley Microwave Foods and incorporated herein by reference. Golden Valley Microwave Foods has marketed such products using such techniques under the name "ACT II® 96% Fat-Free Popcorn". The products generally comprise coated kernels of popcorn, which are popped in a microwave bag construction, to generate a flavored popped popcorn product.

Another technique for providing flavored microwavable popcorn kernels and a microwave popped flavored popcorn product, without added oil/fat, is disclosed in U.S. Ser. No. 08/397,481, filed Mar. 2, 1995, now U.S. Pat. No. 5,585,127, the disclosure of which is incorporated herein by reference. That application discloses a method which generally includes steps of applying an aqueous-based adhesive composition to the flakes of pre-popped popcorn; applying a dry flavorant composition to the flakes of popcorn; followed by a step of drying to avoid undesired loss of crispness due to excess moisture. That invention also discloses a method of applying a flavoring composition to kernels of unpopped popcorn, which can be popped in a microwave oven. The method in general includes steps of applying an aqueous-based adhesive composition onto unpopped kernels of popcorn; followed by a step of drying the moisture from the kernels of popcorn.

SUMMARY OF THE INVENTION

In general, techniques are described herein for preparing flavored consumer products and for preparing products for ultimate ingestion. In one embodiment, an unpopped popcorn product comprising coated kernels which can be popped conveniently, for example in a microwave popping process, is provided.

According to the present invention, a method of applying a flavorant composition and flavorant facilitator to unpopped popcorn kernels is provided. In a preferred embodiment, the method includes steps of applying an aqueous-based adhesive composition to the kernels of unpopped popcorn; after the step of applying the aqueous-based adhesive composition, applying a dry flavorant composition to the kernels of popcorn; and after the step of applying the dry flavorant on to the kernels of unpopped popcorn kernels, applying a flavorant facilitator.

In preferred applications, the adhesive composition contains about 0.5–15.0% by weight of adhesive. The amount, however, can be varied depending upon a particular adhesive used. Preferred ones are identified herein.

The flavorant facilitator of the invention can be a liquid having a boiling point of at least 150° F. In some applications, the flavorant facilitator is glycerin. According to one application, glycerin can be applied at 0.1–6.0% of the weight of flavorant coated unpopped popcorn kernels.

With respect to the application of an aqueous-based adhesive to unpopped popcorn kernels, preferably the step of applying comprises no more than about 1.4% (and preferably about 0.1 to 0.5%) by weight adhesive composition, based on the weight of kernels. Also preferably for application on popped kernels, the adhesive composition contains no more than about 15% by weight adhesive, with a specific amount being variable depending on the particular adhesive chosen.

Also according to the present invention, an unpopped popcorn product is provided. The unpopped popcorn product can generally be prepared according to the process of the invention. Hence, a product of the invention can be prepared according to a process of applying a flavorant composition; and after applying the flavorant composition, applying a flowable flavorant facilitator to cover the coated kernels of unpopped popcorn. The flavorant composition can include salt. In one preferred embodiment, if salt is applied in the flavorant composition it is applied at a rate of at least 2 g of salt per 100 g of unpopped kernels.

DETAILED DESCRIPTION OF THE INVENTION

As indicated above, the principles disclosed herein concern the preparation of flavored kernels from which freshly popped popcorn can be made.

I. Coated, Unpopped Kernels for Preparation of Flavored, Freshly Popped Popcorn Products In general, the techniques described herein can be used to prepare coated, unpopped kernels from which flavored, freshly popped, popcorn products can be prepared. Thus, for example, with the techniques described herein, a package of microwavable popcorn product can be prepared which, when placed in a microwave oven and appropriately exposed to microwave energy, will result in a freshly popped, flavored, popcorn product for the consumer. In some instances, the techniques disclosed herein are also suitable to prepare coated, unpuffed (unpopped) seed grains or kernels from which flavored puffed (popped) products can be prepared.

In general, the techniques include use of a flavorant facilitator, in association with unpopped popcorn kernels. In some applications, the kernels include an aqueous-based adhesive composition or tackifying composition, applied to the unpopped kernels. In certain preferred applications, after the adhesive composition is provided on the popcorn, flavorant and, optionally, various adjuvants are added as a dry mixture. For these specific, presently preferred, applications, after the flavoring adhesive and flavorant composition is applied, excess moisture is dried from the kernels and the flavoring facilitator is applied. However, specific methods used, and amounts applied, may be varied somewhat.

An advantage to the use of the herein disclosed flavorant facilitator is, in some applications, providing to the consumer a popped popcorn product having an enhanced flavor impact. For example, in many instances, the flavorant facilitator provides enhanced flavor impact, relative to the flavor impact provided by use of an equal amount of flavorant composition similarly applied but without a flavorant facilitator. Advantageously, in preferred systems the facilitator can be used to provide for application of a reduced amount of flavorant composition without a reduced flavor impact, relative to the flavor impact obtained using a greater amount of flavorant composition in the absence of a flavorant facilitator. It is noted that the techniques of the invention, including a flavorant facilitator, can be applied to any pre-processed or natural product which can be puffed or popped, for example, pork rinds or amaranth. Flavorant facilitators suitable for the invention is described herein.

In one embodiment of the invention, the flavorant facilitator can be glycerin. Generally, glycerin can be applied at about 0.05 to 8%, of the weight of uncoated kernels. Alternatively, glycerin is typically applied at about 0.1–6.0% of the weight of coated kernels.

A. Preferred Consumer Products Made Utilizing the Techniques Described Herein

The disclosures of U.S. Ser. No. 08/198,892, 08/391,437, both now abandoned and 08/397,481, now U.S. Pat. No. 5,585,127, concern modifying microwave popcorn in such a manner that a shelf stable unpopped popcorn product is provided that can be readily popped by exposure to microwave energy, to provide a flavored popcorn with a relatively high flavor impact. The present invention, however, provides techniques that can be used for "enhancement" of flavor.

In the cited prior applications, the term "high flavor impact" referred to the retention, on popped popcorn kernels, of a substantial amount of the flavoring provided on the original unpopped kernel, as opposed to loss of the flavoring in processing or to the bottom of the package or bowl. That is, in these products a substantial portion of the flavoring is retained on the kernel, i.e., the hull of the popped popcorn, and it does not fall of or become lost in packaging or during popping.

According to the present invention, the term "enhanced high flavor impact" provides further flavor retention over that which was previously disclosed. Through the use of the herein described flavorant facilitator, enhanced high flavor impact may be attributed to increased adherence of the flavorant to the kernel during processing, packaging, shipping or storage; increased adherence of the flavorant to the kernel during popping; distribution of the flavorant to the flakes of popped popcorn during popping; or a combination of these affects. As used herein, "flakes" means the white lobes of starch that result when the popcorn is popped. It is not intended to include the hull portion of a piece of popped popcorn.

The techniques described herein can be practiced such that flavoring can be provided in the absence of popping with added oil or fat. Thus, except for small amounts of oil or fat that may be contained in the flavorings themselves, the popcorn can be prepared essentially "low fat," or "no added fat," or "reduced fat." In this context, the term "no added fat" and similar terms are meant to characterize the fact that the methods are developed to occur without added fat or oil to facilitate popping, mouth feel, or flavor. When the term is used, small amounts of oil or fat in the flavorings, and fat inherent in the popcorn (about 3–5% by weight), are disregarded. Because of the low relative fat content present in the flavorings, generally, products according to the present invention will form popcorn, when popped, having a fat content of about 3–4%, and typically no more than 5% by weight.

In general, a typical consumer product would comprise a package containing microwavable popcorn, which the consumer can place in a microwave oven and, through exposure to microwave energy, pop. The flavor would be provided on the popcorn, without further operation by the consumer. That is, the consumer need only open the bag to consume the flavored popcorn. The bag need not be shaken to distribute flavor, and the flavor will generally be well adhered to the hulls and/or flakes of the popped popcorn. The popcorn may be popped utilizing conventional bag constructions for microwave popcorn, such as those described in U.S. Pat. Nos. 4,450,180; 4,548,826; 4,691,374; and 5,044,777, incorporated herein by reference. The arrangements described in the U.S. application Ser. No. 08/389,755, filed Feb. 15, 1995, now abandoned, incorporated herein by reference, may also be used. This latter application is owned by Golden Valley Microwave Foods, Inc.

While variations are possible, in a typical consumer product about 78 grams (approximately 515 kernels) of coated unpopped microwave popcorn are provided in a single pouch or bag construction. Such an amount of popcorn generally will pop to a volume of about 2200 to 3000 ml.

According to the present invention, a 78 gram, coated, unpopped, popcorn sample generally demonstrates a percent yield of coating which remains on the popcorn after popping in excess of 80%, typically in excess of 90%, indeed amounts above 95% can often be achieved. The term "yield" in this context refers to the percentage of coating on the kernels before popping that remain on the popped kernels.

In general, a 78 gram sample of coated unpopped popcorn made according to the preferred methods described herein includes at least about 1 gram, typically and preferably at least 2.5 grams, and for some compositions more preferably at least 2.85 grams, of coating thereon. This corresponds, in a 225 gram sample, to at least about 2.99 grams, preferably at least 7.2 grams of coating, and for some samples more preferably at least about 8.2 grams. Herein, the term "coating" in this context refers to the aqueous-based adhesive and applied flavorant composition. The below described flavorant facilitator is applied subsequently.

It is noted that many of the preferred coatings described herein do not include any starch component. The particular manner in which the coating is conducted, using low moisture and spray techniques, allows for application of the adhesive (for example, gums) to obtain a good coating with good properties and yield, without the need for starch. The coating procedure is also observed to provide for a relatively hard crust that remains well fixed on the kernels, even during processing and packaging steps, and thus is advantageous.

B. The Tack or Adhesive Composition

The adhesive composition is preferably applied in the form of an aqueous-based composition. The composition is sometimes referred to as a "tacking" or "tackifying" composition. The composition is preferably a solution, rather than a suspension.

A variety of tacking agents or adhesives may be used. Materials usable as the tacking agent comprise bacterial polysaccharide gums such as gellan gum, xanthan gum, gum arabic, and cellulose gum or mixtures thereof. By "bacterial" in this context, it is meant that the gum comprises a product of a microorganism's operation on a fermentation medium. For example, gellan gum is produced by the microorganism *Pseudomonas elodea* (ATCC 31461). Xanthan gum comprises the fermentation product of *Xanthomonas campestris*. Gum arabic, also known as Gum acacia, is the dried gummy exudate from stems and branches of *Acacia Senegal* (Linne), Willdenow or other related African species of acacia. A useable cellulose gum is sodium carboxymethyl cellulose.

The presently preferred gum is gellan gum. Gellan gum is available under the mark Kelcogel F, from the Nutrasweet Kelco Co., San Diego, Calif. Kelco K3B408 is a particularly preferred gellan gum for utilization in coating compositions for unpopped popcorn. Kelco K3B408 is available from the Nutrasweet Kelco Co., San Diego, Calif.

TIC Gums No-Fat Snack Blend is another preferred gum for utilization in compositions for application to unpopped popcorn. In certain preferred compositions, exemplified below, mixtures of a gellan gum product available under the trade designation K3B408 and TIC Gums No-Fat Snack Blend, available from TIC Gums, Inc. of Belcom, Md., will be most preferred. K3B408 gellan gum is a blend of gellan gum and sodium citrate. The sodium citrate facilitates the hydration of gellan gum at ambient temperatures (60°–70° F.; 15.5°–21.1° C.) in tap water; thus the sodium citrate helps dispersion of the gum in tap water. TIC Gums No Fat Snack Blend is a blend of maltodextrin, corn syrup solids, gum acacia, and cellulose gum.

In preferred applications, the solution will contain no more than an amount of moisture which is needed to provide a good distribution of the coating over the kernels, and to maintain the adhesive material in solution during application. In the case of unpopped kernels, generally less than 2%, and preferably about no more than 1.4%, of adhesive composition is applied, by weight of popcorn, typically 0.5–1.2%. Indeed, only about 1.12% of tacking solution (by weight raw kernel) is required for preferred applications Preferably, the adhesive composition contains about 0.05–15.0%, by weight, adhesive, the remainder preferably being water (or in some instances also adjuvant). When the adhesive is gellan gum, preferably the solution contains about 0.05–1.0% adhesive, by weight. When it is the TIC Gums No-Fat material, it is preferably 9–15% adhesive, by weight.

In part because of the methods of application desired, it is preferred that the tackifying agents or adhesives used in adhesive compositions according to the present invention are ones which are soluble in water; and, it is preferred that the adhesive compositions be prepared as solutions, i.e. with the gum(s) fully dissolved. It is also preferred that the solubility be such that at least about 0.5 g to 15 g of gum can be readily dissolved per 100 ml of water (at ambient). Usable, commercially available, gums which satisfy this requirement include the following:

Kelcogel F, from the Nutrasweet Kelco Co., San Diego, Calif.

Kelco K3B408, from the Nutrasweet Kelco Co., San Diego, Calif.

TIC Gums No-Fat Snack Blend, from TIC Gums, Inc., Belcom, Md. 21017-0369

Gum Arabic, NF Premium, spray dried Type A-180, from Gumix International, Fort Lee, N.J. 07024-7552

Keltrol GM, Xanthan gum, from Kelco Division of Merck & Co., Inc., San Diego, Calif. 92193

Methocel (A4MP or K4MP) Cellulose Gum, from Dow Chemical, Midland, Mich. 48674.

Maltrin 100, Maltodextrin, from Grain Processing Corp., Muscatine Iowa, 52761.

The adhesive compositions can be prepared by mixture at ambient temperature. They may optionally include some flavoring and/or coloring (or other adjuvants). However, as indicated previously, it is preferred that the adhesive compositions comprise solutions. Thus, any flavoring and/or coloring (or other adjuvants) provided in the adhesive or tacking composition should be in solution. In general, if flavorant or other adjuvant is included in the tacking solution, it will be preferred not to include more flavoring/coloring or other adjuvants than will fully dissolve in the amount of moisture needed to provide the adhesive in a solution form and to effectively coat the popped popcorn flakes. Typically any dissolved flavorant and/or other adjuvant will be at a level of about 0.1–2.0%, by weight, in the adhesive solution.

Generally, when flavorants and/or other adjuvants are put in the adhesive solution, it is to enhance the performance of later added flavorant(s), for example salt. Applying some flavorings and adjuvants in the adhesive solution may improve the uniformity of the distribution of flavor.

C. Flavorant and Adjuvants

Flavorant(s) and adjuvant(s) (other than any that may have been included in the mist) are preferably added as a dry mix, sifted onto the kernels. Preferably, the dry blend is applied to the kernels before the surfaces of the kernels are completely dried.

Fine powders are preferred, for the dried blend, in order to obtain relatively even distribution of the flavor. Thus, preferably dry mixes that are sifted to 50–240 (or 50–250) mesh (U.S. Standard Mesh) are used. By this is meant that the particles are generally smaller than 50 mesh and greater than about 240 or 250 mesh.

In general, spray dried and dry encapsulated flavors are preferred, so the flavorant can be blended and be readily applied directly to the surface of the kernel.

If the selected flavoring is to include salt, in general it is preferred that a very fine grind, or powdered, salt be utilized. An acceptable such material is the one available under the tradename MORTON SALT 200 from Morton International (Morton Salt, Chicago, Ill. 60606). This material goes through a 200 USS mesh. Another usable salt material is available under the designation Morton Flour, from Morton Salt. This material is 70–240 USS mesh.

In general, ordinary table salt is not preferred. Such relatively large crystals tend not to adhere as well, when applied. This decreases the batch yield and ultimately the amount of flavoring which is delivered to the consumer (on the flakes).

In general, to provide a desirable salt flavor, at least about 100 g of salt should be applied per 1500 g unpopped popcorn kernels.

Besides salt flavorings, a variety of alternative or additional flavorings may be utilized. For example, in many applications a preferred flavoring mixture (for many consumers) will be a butter/salt mixture. For such a mixture, the butter flavoring can be provided through the utilization of artificial butter flavors. Preferred ones are Encapsulated Starter Distillate-50× (available from Chris Hanson's Laboratories, Inc., Milwaukee, Wis. 53214), Natural Butter Flavor NF 6258 Dry, (also available from Chris Hanson's Laboratories), and Butter Flavor, NF5048, (also available from Chris Hanson's Laboratories). Certain preferred compositions, for providing a salt/butter flavor, are described herein below, in the examples.

Techniques according to the present invention can also be used to generate certain forms of sweetened or sweet flavored popcorn flakes. One such composition is described hereinbelow. In general, preferred materials for forming sweetened flavor include the following artificial flavors:

Sunett, acesulfane potassium, from Hoechst Celanese, Edison, N.J. 08818

Aspartame 200, from Sanofi Bio-Industries, Fairfield, N.J. 07066.

Another popular flavor for popcorn is cheese flavor. In general, a cheese flavor can be accomplished through utilization of, in addition to salt and butter flavor, commercial cheese flavors such as Tastemaker Cheese flavors #308342, #308962 and #304558; Tastemaker, Cincinnati, Ohio.

A wide variety of other flavors or flavor enhancers can be used. For example, peanut flavors, yeast extracts, or similar materials are usable. Also a wide variety of spice flavors are usable, for example: herb and garlic; sour cream and onion; honey mustard; hot mustard; dry roast; barbecue; jalapeno; or Mexican. If the spices are not dry powders, so they can be dry mixed with the other flavorants/adjuvants, in general they should be supported upon a powdered base such as maltodextrin or cornstarch. For example, Tone's dry roast seasoning (T-067) from Tone's Industrial Seasonings, Des Moines, Iowa. 50301 is supported on such a powdered system.

As indicated previously, various sweet flavorings can be utilized. For example: chocolate, chocolate mint, mint, chocolate banana, vanilla, pineapple, coconut, cherry and peppermint flavorings may be provided. In many instances these materials are liquid flavors. They may be provided either in the solution including the adhesive, or in the dry powder by loading on to a powder or mixing such that they are well dispersed with the dry material and do not generate a sticky mess.

Other adjuvants may be included in the dry powder mix, to be sifted onto the kernels. For example, calcium chloride, which bonds upon contact with gellan gum, may be used to improve strength and speed of bonding of the components of the gum.

One adjuvant found useful in connection with applications according to the present invention, to unpopped kernels, is silicon dioxide ($SiO_2$). A commercially available silicon dioxide additive useable is Zeothix 265 (J. M. Huber Corp., Etowah, Tennessee and Havre de Grace, Md.). In general, the presence of silicon dioxide is observed to help keep kernels from adhering to one another. When it is used, preferably, silicon dioxide is added after the kernels are flavor-coated and dried to the desired moisture content. The powdered silicon dioxide is typically poured on to the coated kernels and the kernels are tumbled to distribute the silicon dioxide evenly.

Another suitable adjuvant to prevent kernels from adhering to one another is a modified food starch, for example, DRY-FLO, available from National Starch and Chemical Co., Bridgewater, N.J., 08807-0550.

In general, the flavorants should be mixed dry for application by sifting, in a manner similar to the techniques described above with respect to the pre-popped popcorn. A flavorant sift of about 70–250 U.S. standard mesh will be preferred.

After the application of the dry powders, a drying process of the coated kernels should be initiated, preferably immediately and by hot air drying. Air temperatures from the heat sources used for the air drying will typically be within the range of about 200–600E F (93°–316° C.) Relatively higher temperatures are generally preferred, so that the moisture is driven off as quickly as possible to maintain the final product quality. Drying times on the order of about 10 minutes have been used and are convenient.

D. Flavorant Facilitators

A flavorant facilitator enhances the flavor impact of the flavorant to the consumer by providing increased flavorant retention, and in some instances distribution, on popped popcorn relative to that which was originally present on the unpopped kernel. Although there is no intent to be held to a single theory, in part, it is believed that a theoretical function of the flavorant facilitator is to distribute (or adhere) onto the popped popcorn kernel and flakes, separated flavorant, for example, which may otherwise be lost from the kernel as a result of popping. The flavorant facilitator may also (or alternatively) act to reduce loss of the flavorant from the hull of the kernel during processing, packaging, storing or popping. Regardless of the mechanism(s), the flavorant facilitator provides for a higher level of flavorant to be on the popped popcorn kernel or hull rather than being left in the popping container, or to fall off in the bowl.

A flavorant facilitator of the invention provides for flavor enhancement of coated unpopped popcorn kernels which can be popped in a microwave oven. The unpopped popcorn kernels, flavorant and flavorant facilitator are typically packaged for consumer use in a microwavable container including a microwave interactive construction or susceptor. Hence, the consumer can place the package of microwavable popcorn into a microwave oven, pop the popcorn and open the bag, to consume the popcorn without the need for shaking or other further operation. Typically consumption will involve pouring the popped kernels into a bowl or dish. Examples of suitable microwave popcorn bag constructions, including microwave interactive constructions, were provided above.

The flavorant facilitator should be suitable for pre-popping storage in a microwave popcorn container. Generally, a flavorant facilitator of the invention provides the desired flavorant retention effect without undesirable levels of seepage from the product package. Preferably, if the flavorant facilitator is a liquid at room temperature or storage temperatures, it is a material that, in the amounts used, will provide the desired effect without undesirable levels of pooling of the liquid in the container. Moreover, the facilitator should provide flavor enhancement in the presence of a microwave interactive susceptor without undesirable levels of charring, burning, smoking, or other effects which substantially taint the flavoring of the popped product.

According to the invention, a flavorant facilitator is a non-fat, non-oil material which is flowable at microwave temperatures. As used herein, a "fat" is a tri-fatty acid glyceride which is a solid at room temperature. An oil is defined similarly to a fat, but typically is a liquid at room temperature. The term "flowable" means that under the conditions of, at the temperatures reached during, microwave popping, the flavorant facilitator is not in a solid, non-flowable form. Preferably, the flavorant facilitator can withstand the temperatures reached during microwave popping without undesirable char or burn, at least within the times involved for popping, usually 1 to 5 minutes.

In one preferred embodiment, the flavorant facilitator is a liquid at production temperature. By "production temperature", it is meant that temperature at which a flavor coated unpopped popcorn product of the invention is typically manufactured. Generally, this temperature is about 60° to 100° F. (15°–38° C.). Preferably, the liquid flavorant facilitator has a boiling point greater than 150° F. (65° C.).

A liquid flavorant facilitator may be added to the unpopped popcorn kernels by such methods as pouring, dipping, spraying or pumping although alternatives can be used. The flavorant facilitator should provide the desired effects without affecting the taste, texture and consistency of the popped product. Preferably, the flavorant facilitator provides a mouth feel similar to a "fat like" eating experience. Negative effects to avoid, or to have below unacceptable levels, include, for example, soggy flakes, slippery surface, irregularly shaped flakes, decreased popped volume, and undesirable carry through flavor of the flavorant facilitator.

Liquid flavorant facilitators suitable for the invention, include, for example, glycerin or propylene glycol. Preferably, the glycerin used is 99.7% pure. One example of a preferred glycerin is sold under the mark OPTIM, by Dow Chemical, Midland, Mich., 48674. Mixtures of materials may be used as the flavorant facilitators E. Application of the Tacking or Adhesive Solution to the Kernels Preferably the tacking or adhesive solution is applied to the unpopped popcorn kernels in a manner that ensures relatively even and thorough coating. A variety of application techniques may be used, for example, spraying, ladling, etc. In general, for application by spraying, which is preferred, what is preferred is a spraying arm with several nozzles, directed to apply the composition to kernels in a pan-type coater. It is not required that the spray or mist be as fine as is preferred for coating pre-popped flakes, as described in U.S. Ser. No. 08/397,481 now U.S. Pat. No. 5,585,127.

In preferred processes, the kernels are rotated in a pan-type coater while the spray is applied. The spray, typically, should be applied over about a one to three minute time frame (preferably 1.5 to 2.0 minutes).

F. Application of the Flavoring Sift and Drying

The flavoring is preferably sifted onto the wet kernels after the mist has been applied thereto, and while the kernels are tumbled in the coater. The tumbling should be conducted until the powder is distributed substantially evenly.

Timing of drying for coated kernels is less critical than with popped flakes (described in U.S. Ser. No. 08/397,481 now U.S. Pat. No. 5,858,127), because kernels do not readily absorb water. However, in general, for preferred processes the excess moisture will be dried from the coated kernels, immediately or shortly, after application of the dry mix. The drying should preferably be conducted until a moisture level (for the coated product) of between about 11% and 13% is obtained (i.e. the preferred moisture level of raw, uncoated, unpopped popcorn kernels). Air temperatures from the heat source ranging from about 160E to 200EF (71°–94° C.) (forced heated air) will be preferred. Dry cycle times on the order of about 3 to 16 minutes per 630 lb. batch (typically containing about 5 to 8 lbs. of tacking solution) will be preferred.

Although unpopped kernels are not as susceptible to moisture damage as are popped kernels, in general it is desirable to apply as little moisture as is reasonably possible, in accomplishing the coating with the adhesive material. A reason for this is that less energy well be needed to drive off the moisture during the drying processes.

Thus, in general, as with the application of the pre-popped popcorn, the following three factors will typically be of importance in defining processes which are preferred.

1. The amount of water (or adhesive composition) applied per weight of popcorn, in conducting the initial coating.
2. The amount of adhesive applied per weight of popcorn, to achieve the desired level of adhesiveness; i.e. achievement of an effective amount of adhesive.
3. The rate of drying, to achieve a residual coating with a flavorant secured thereto.

In addition, to have desirable handling characteristics, it is preferred that the unpopped kernels be provided in a form such that they do not stick to one another during the processing, and so that they can be processed and handled without individual kernels knocking off substantial amounts of flavorant or coating, by bumping into one another. Factors of some significance with respect to this include: the fineness of the dry flavoring powder applied to the kernels; the nature of the adhesive; and the amount of adhesive and flavorant applied per weight of kernel. In general, it has been observed that the coated kernels, of preferred products, comprise about 1–4% by weight coating (adhesive+ flavorant+adjuvant).

For a salt-flavored formula, preferably at least about 2 grams of salt are applied per 100 gram of unpopped kernels.

G. Application of the Flavorant Facilitator

A flavorant facilitator of the invention is preferably added to the unpopped popcorn kernels. The flavorant facilitator may be added simultaneously with application of a flavorant. Typically, the flavorant facilitator is applied to unpopped popcorn kernels after the aqueous-based adhesive and dry flavorant composition are applied. Preferably, excess moisture is dried from the kernels before application of the flavorant facilitator. Preferably the kernels themselves are cooled to a temperature no greater than about 90°–100° F. (32°–38° C.), preferably to within the range of 60° to 85° F. (15°–30° C.), before the flavorant facilitator is applied.

Preferably the flavorant facilitator is applied to the unpopped popcorn kernels in a manner that helps ensure relatively even and thorough covering of the kernels, for example, pouring, spraying, pumping, ladling, or similar methods.

The flavorant facilitator is preferably applied at a level to provide the desired effects without substantially affecting (in a negative manner) the taste, texture, volume and consistency desired by consumers of popped popcorn products. Undesirable effects on the popped popcorn kernel which are preferably avoided include, for example, clumping, charring, burning, sogging, or decreased popped volume.

Preferably, the flavorant facilitator should also be applied to avoid affecting (in a negative manner) the processing, shipping and storage of the unpopped product. Undesirable processing or packaging effects of a flavorant facilitator include, for example, seepage through the container during storage.

Typically, when glycerin is used as a flavorant facilitator it is applied at a weight percentage of no more than 10% of the total weight of coated popcorn. At percentages greater than 6%, there can be a tendency for the unpopped kernels to clump, or the popped product to have some glycerin flavor, a slippery surface, increased packing, irregularly shaped kernels or decreased popped volume. When the percentage is greater than 10%, there typically is an unacceptable level of these problems. In addition, higher weight percentages of glycerin may tend to cause charring or burning of the coated kernels during microwave popping. Desired flavorant facilitator effects of glycerin typically start to be present at levels of about 0.1% of the total weight of unpopped popcorn. Preferably, when glycerin is used it is applied at about 0.2% to 3.0% of the total weight of coated popped popcorn kernels, more preferably 0.5% to 1.0%.

EXPERIMENTAL

The principles applied in preparing products of the invention include certain techniques generally described in U.S. patent application Ser. No. 08/397,481 now U.S. Pat. No. 5,858,127. In the examples reported herein, footnotes are used to identify information about the various ingredients. Throughout the Experiments, these footnotes have the following meanings:

1 K3B408, the Nutrasweet Kelco Co., San Diego, Calif. 92193.

2 Less than 200 USS mesh screen; Morton Salt, Chicago, Ill. 60606.

3 Tastemaker, Cincinnati, Ohio 45216

4 Chris Hanson's Laboratories, Milwaukee, Wis. 53214

5 Bush Boake Allen, Inc., Chicago, Ill. 60618-9931

6 OPTIM, Dow Chemical Co., Midland, Mich. 48674.

7 Maltrin M-100, Grain Processing Corp., Muscatine Iowa 52761.

8 Kelcogel F, Nutrasweet Kelco Co., San Diego, Calif.

Experiment 1

Provision of Flavor-Containing Coating on Unpopped Kernels for Microwave Popping

| Sample 1 | A (g) | B (g) |
|---|---|---|
| The components were as follows: | 550.04 | 549.98 |
| Unpopped Popcorn Kernels | | |
| Tacking Solution: | .056 | .056 |
| 7% Solution K3B408[1] | | |
| Pre-blend Total: | 27.20 | 27.20 |
| Pre-blend Components: | | |
| Morton Salt 200[2] | 21.00 | 21.00 |
| Tastemaker #347186[3] (butter flavor) | 3.90 | 3.90 |
| Encap Starter Distillate 50X[4] (butter flavor) | 2.30 | 2.30 |
| Coated Unpopped Popcorn Kernels (Dried to about 11%–14% moisture by forced hot air). | 569.92 | 569.37 |

The material of sample 1 does not include a flavorant facilitator

Experiment 2

Provision of Flavor-Containing Coating on Unpopping Kernels for Microwave Popping

| Sample 2 | A (g) | B (g) |
|---|---|---|
| The components were as follows: | 550.02 | 549.99 |
| Unpopped Popcorn Kernels | | |
| Tacking Solution: | 0.056 | 0.056 |
| 7% Solution K3B408 | | |
| Pre-blend Total: | 27.20 | 27.20 |
| Pre-blend Components: | | |
| Morton Salt 200[2] | 21.00 | 21.00 |
| BBA 85262[5] | 3.90 | 3.90 |
| Encap Starter Distillate 50X[4] (butter flavor) | 2.30 | 2.30 |
| Coated Unpopped Popcorn Kernels (Dried to about 11%–14% moisture by forced hot air). | 568.89 | 564.14 |

The material of sample 2 does not contain a flavorant facilitator.

Experiment 3

Provision of Flavor-Containing Coating on Unpopped Kernels for Microwave Popping

| Sample 3 | A (g) | B (g) |
|---|---|---|
| The components were as follows: | 550.00 | 549.98 |
| Unpopped Popcorn Kernels | | |
| Tacking Solution: | | |
| Morton 200[2] | 0.16 | 0.16 |
| M-100[7] | 0.06 | 0.06 |
| Kelcogel F[8] | 0.06 | 0.06 |
| Pre-blend Total: | 27.20 | 27.20 |

-continued

Sample 3

| Pre-blend Components: | A (g) | B (g) |
|---|---|---|
| Morton Salt 200[2] | 21.00 | 21.00 |
| Tastemaker #347186[3] (butter flavor) | 3.90 | 3.00 |
| Encap Starter Distillate 5OX[4] (butter flavor) | 2.30 | 2.30 |
| Coated Unpopped Popcorn Kernels (Dried to about 11%–14% moisture by forced hot air). | 561.28 | 566.93 |

The material of sample 3 does not contain a flavorant facilitator.

Experiment 4
Provision of Enhanced Flavor-Containing Coating on Unpopped Kernels for Microwave Popping
Sample 4

Sample 4 was prepared using the same tacking solution and pre-blend formulations as Sample 1. The components were as follows:

| | Grams |
|---|---|
| Unpopped Popcorn Kernels | 549.98 |
| Tacking Solution: .7% Solution K3B408[1] | .056 |
| Pre-blend | 27.20 |
| Coated unpopped popcorn kernels (Dried to about 11%–14% moisture by forced hot air). | 569.20 |

After coating the unpopped popcorn kernels, 3 grams of glycerin[6] was applied; 3 grams is about 0.5% of the total weight of coated unpopped popcorn kernels. The glycerin was applied by dripping onto the tumbling corn to evenly distribute the glycerin, after the coated kernels had been dried and cooled to less than 95° F. (35° C.).

Experiment 5
Provision of Enhanced Flavor-Containing Coating on Unpopped Kernels for Microwave Popping
Sample 5

Sample 5 was prepared using the same tacking solution and pre-blend formulations as Sample 1. The components were as follows:

| | Grams |
|---|---|
| Unpopped Popcorn Kernels | 550.03 |
| Tacking Solution: .7% Solution K3B408[1] | .056 |
| Pre-blend | 27.20 |
| Coated unpopped popcorn kernels (Dried to about 11%–14% moisture by forced hot air). | 571.67 |

After coating the unpopped popcorn kernels 17.15 grams of glycerin[6] was applied. 17.15 grams of glycerin is about 3% of the total weight of coated unpopped popcorn kernels. The glycerin was applied by dripping onto the tumbling corn, to evenly distribute the glycerin, after the coated kernels had been dried and cooled to less than 95° F. (35° C.).

Experiment 6
Provision of Enhanced Flavor-Containing Coating on Unpopped Kernels for Microwave Popping
Sample 6

Sample 6 was prepared using the same tacking solution and pre-blend formulations as Sample 1. The components were as follows:

| | Grams |
|---|---|
| Unpopped Popcorn Kernels | 550.03 |
| Tacking Solution: .7% Solution K3B408[1] | .056 |
| Pre-blend | 27.20 |
| Coated unpopped popcorn kernels (Dried to about 11%–14% moisture by forced hot air). | 571.13 |

After coating the unpopped popcorn kernels 34.25 grams of glycerin[6] was applied. 34.25 grams of glycerin is about 6% of the total weight of coated unpopped popcorn kernels. The glycerin was applied by dripping onto the tumbling corn, to evenly distribute the glycerin, after the coated kernels had been dried and cooled to less than 95° F. (35° C.).

Experiment 7

Pre-popped Flaking

Herein the term "pre-popped flaking" is used to refer to the amount of coating observed to be readily lost (or potentially to be lost) during handling, but prior to popping.

The equipment used is as follows:

1. Tumbler plus stainless steel canister (INDCO tumbler No. RM101;, INDCO, INC. New Albany, Ind.) (115V; 60HZ; 0.54 amp.).

2. Balance (accurate to 0.01 amp).

3. Timer.

In general, the procedure used for the assessment of the coating was as follows:

An approximately 225 gram sample of the coated unpopped popcorn to be assessed was isolated and weighed, to 0.01 gram (INITIAL WT). The sample was poured into the tumbler canister (depth 10 cm.; diameter 8.5 cm.). The canister was rotated (about a generally horizontal axis) in the tumbler for one hour at ambient temperature (or 54 revolutions per minute-rpm). The entire contents of the tumbler canister were poured onto a No. 12 sieve. Any residue that may have fallen off the corn in the tumbler was collected. The sieve was tapped 50 times by hand (about a 1 inch, gentle, tap), to ensure that all loose flaking was separated from the kernels. The kernels of coated corn were then weighed (FINAL WT). The difference (Pre-Popped Flaking) reflected the amount of flaking, or loss of coating, before or during the tumbling but prior to popping. Greater amounts of flaking or loss are reflective of a less desirable product, since the coating would have a greater propensity to flake off the kernel during processing, packaging the corn, or in handling prior to popping.

Results for the tests are reported in Table I below. Four pre-popped flaking values were obtained for each of samples 1–3 which were prepared as described in Experiments 1–3, respectfully.

TABLE I

| Sample | | Initial Wt. (g) | Final Wt. (g) | Pre-Popped Flaking (g) | Average Pre-popped flaking (g) |
|---|---|---|---|---|---|
| 1 | | | | | 0.0225 |
| | 1 | 225.03 | 224.97 | 0.06 | |
| | 2 | 225.03 | 225.01 | 0.02 | |
| | 3 | 225.03 | 225.03 | 0 | |
| | 4 | 225.03 | 225.02 | 0.01 | |
| 2 | | | | | 0.18 |
| | 1 | 225.03 | 225.02 | 0.1 | |
| | 2 | 225.03 | 224.74 | 0.29 | |
| | 3 | 225.03 | 224.84 | 0.19 | |
| | 4 | 225.03 | 224.89 | 0.14 | |
| 3 | | | | | 0.1325 |
| | 1 | 225.03 | 224.99 | 0.04 | |
| | 2 | 225.03 | 224.75 | 0.28 | |
| | 3 | 225.03 | 225.03 | 0 | |
| | 4 | 225.03 | 224.82 | 0.21 | |

Experiment 8
Evaluation of Amount of Coating Put on Unpopped Kernels

Another method to determine percentage coating retention is the "wash down method". The "wash down method" evaluates how much coating was actually applied to each sample. That is, how much was, in fact, retained on the kernels. The washdown method is described below. For the experiment, approximately 78 gram samples of coated popcorn material were used.

The Washdown Method
Equipment:
Electronic Sale
Moisture Analyzer (Computrac Max. 50; from Arizona Instruments, Inc. of Phoenix, Arizona)
Mill (Cemotec 1090 Sample Mill, Manufactured by Tectator, Hoganes, Sweden; obtained from Fisher Scientific)
2–500 ml Erlenmeyer flasks
Sieve (No. 12–1.70 MM) Heat gun (Master Appliance Corp., Racine, Wis. 53403)

For each of samples 1–3, prepared as described in Experiments 1–3, respectively, four 78 gram samples of the coated popcorn were evaluated. For each 78 gram sample, a measurement of the amount of coating by the washdown method was used. Also, a measurement of the amount of moisture on uncoated corn was made. Moisture measurements were made by grinding a small portion of sample in the mill, at the finest grind setting, and then analyzing in the moisture analyzer. This was done on raw corn and also on samples after washing and drying.

The procedure was as follows:

1. Weigh out two 78 gram samples of the selected formulation of coated corn to be evaluated. Record the weight (in grams) of the samples to the hundredths place.

2. Determine moisture level of raw (uncoated) corn, with moisture analyzer.

3. Pour each coated corn sample into separate 500 ml flasks.

4. Pour 200 gram of tap water (100EF±3EF) over each of the samples of coated corn in the flasks, and swirl for 3 minutes.

5. Pour each washed sample into a No. 12 sieve that will retain the kernels. Gently tap the sieve 10 times, to remove excess moisture. Pour onto a tray to dry.

6. Dry with a hand held heat gun for approximately 2 minutes, keeping the air temperature over the corn at about 100°–115° F. (43°–46.1° C.). Shake the tray to keep the kernels rolling onto different sides during the drying. It is important not to overdry the corn. Continue drying should be conducted at about 90E F for about 20 minutes. At that time, the moisture content of the washed sample will be about the same as the moisture content of the raw corn. This was confirmed with the analyzer.

7. The amount of coating is determined by subtracting the initial weight of sample (weight to the hundredths) from the wash/dried weight of the same sample.

The data is reported in Table II.

TABLE II

| Sample No. | | Wt of Coated Unpopped Popcorn Product | Washed Wt | Coating Wt | Average Coating Wt | Percent Retention* | Average % Retention |
|---|---|---|---|---|---|---|---|
| 1 | | | | | 2.88 | | 78.4204 |
| | 1 | 78.06 | 74.84 | 3.22 | | 87.6024 | |
| | 2 | 78.02 | 75.28 | 2.74 | | 74.5436 | |
| | 3 | 78.02 | 75.25 | 2.77 | | 75.3598 | |
| | 4 | 78.04 | 75.24 | 2.80 | | 76.1760 | |
| 2 | | | | | 2.39 | | 64.8856 |
| | 1 | 78.04 | 76.28 | 1.76 | | 47.8820 | |
| | 2 | 78.00 | 75.39 | 2.61 | | 71.0069 | |
| | 3 | 78.05 | 75.41 | 2.64 | | 71.8231 | |
| | 4 | 78.00 | 75.47 | 2.53 | | 68.8304 | |
| 3 | | | | | 1.58 | | 42.849 |
| | 1 | 78.02 | 76.28 | 1.74 | | 47.3379 | |
| | 2 | 78.00 | 76.09 | 1.91 | | 51.9629 | |

TABLE II-continued

| Sample No. | Wt of Coated Unpopped Popcorn Product | Washed Wt | Coating Wt | Average Coating Wt | Percent Retention[a] | Average % Retention |
|---|---|---|---|---|---|---|
| 3 | 78.01 | 76.51 | 1.50 | | 40.8086 | |
| 4 | 78.00 | 76.85 | 1.15 | | 31.2866 | |

[a]The percent (or "batch yield") was calculated by the formula $$100 \times \frac{\text{Coating Weight}}{\text{Amount of Coating Initially Applied.}}$$

The "Amount of Coating Initially Applied" was 3.6757 gm. This value was arrived at by cacluating the "average uncoated unpopped popcorn kernel weight" of samples A and B, for samples 1–3. The total weight of pre-blend (27.20 gm) was added to the "average uncoated, unpopped popcorn kernel weight" to obtain a "total coated unpopped popcorn kernel weight." The total weight of the pre-blend was then divided by the "total coated unpopped popcorn kernel weight" and multiplied by 100 to obtain the percent coating weight of coated unpopped popcorn (4.7124%).
This percent was then used to calculate the weight of coating, in grams, of an approximately 78 gram sample of coated unpopped popcorn kernels (i.e. 4.7124% × gm = 3.6757 gm).

Experiment 10
Post-Popped Flaking Volume and Final Yield.

To evaluate final yield on the popcorn as it would be when consumed, each sample was popped, and the amount of post-popped flaking was measured. Herein the term "post-popped flaking" refers to the amount of coating loss which occurs during popping and not loss due to pre-popped flaking. Hence, none of the samples tested, for which results are reported in table III, were subjected to pre-popped flaking studies. For the post-popping flaking test, four samples for each formulation were used. Average values are provided.

Samples 1–6 were prepared as described in Experiments 1–6, respectively. For each of samples 1–6, four different samples were popped to determine post-popped flaking, volume, and final yield. The data is reported in Table III. It is noted that samples 4, 5 & 6 were coated with the flavorant coating described in Experiment 1. Hence, the pre-popped coating weight used for a 78 g sample (sample 1) was 2.88 g, the "average coating weight" of the four sample prepared according to Example and reported in Table II. Also, sample 4 was prepared by applying glycerin at a level of 0.5% of total coated unpopped popcorn weight (see Experiment 4); sample 5 was prepared by applying glycerin at a level of 3.0% of total coated unpopped popcorn weight (see Experiment 5); and sample 6 was prepared by applying glycerin at a level of 6.0% of total coated unpopped popcorn weight (see Experiment 6).

In each instance, for the post-popped flaking, the approximately 78 gram sample was placed in an 11.25–12 inch (27.9–30.5 cm) popping bag and popped for 2 minutes 25 seconds in a Kenmore microwave oven. No oil/fat or other additives were used. The popped volume was determined, for each sample, by putting the popcorn into a 4000ml graduated cylinder and gently shaking to level the material.

As seen in table III, the post-popped "percent retention" of popped flavor coated kernels, after application of the flavorant facilitator glycerin, is significantly greater then when no facilitator is used.

TABLE III

| Sample No. | | Volume (ml) | Avg. Volume[b] (ml) | Avg. Sample Coating Wt (From Table II) | Post Popped Flaking (g) | Avg. Flaking (g) | Amt. Of Coating Remaining After Popping[c] (g) | Post Popped % Retention[d] |
|---|---|---|---|---|---|---|---|---|
| 1 | | | 2837.5 | | | 1.705 | | |
| | 1 | 2950 | | 2.88 | 1.74 | | 1.14 | 65.5 |
| | 2 | 2800 | | 2.88 | 1.62 | | 1.26 | 43.8 |
| | 3 | 2750 | | 2.88 | 1.62 | | 1.26 | 43.8 |
| | 4 | 2850 | | 2.88 | 1.84 | | 1.04 | 36.1 |
| 2 | | | 2712.5 | | | 1.005 | | |
| | 1 | 2800 | | 2.39 | 0.99 | | 1.4 | 58.6 |
| | 2 | 2650 | | 2.39 | 0.91 | | 1.48 | 61.9 |
| | 3 | 2700 | | 2.39 | 1.02 | | 1.37 | 57.3 |
| | 4 | 2700 | | 2.39 | 1.1 | | 1.29 | 54.0 |
| 3 | | | 2862.5 | | | 0.93 | | |
| | 1 | 2750 | | 1.58 | 1.15 | | 0.43 | 27.2 |
| | 2 | 2950 | | 1.58 | 0.86 | | 0.72 | 45.6 |
| | 3 | 2850 | | 1.58 | 0.79 | | 0.79 | 50.0 |
| | 4 | 2900 | | 1.58 | 0.92 | | 0.66 | 41.8 |
| 4 | | | 2675 | | | 0.42 | | |
| | 1 | 2650 | | 2.88 | 0.46 | | 2.42 | 84.0 |
| | 2 | 2750 | | 2.88 | 0.39 | | 2.49 | 86.5 |
| | 3 | 2650 | | 2.88 | 0.51 | | 2.37 | 82.3 |
| | 4 | 2650 | | 2.88 | 0.32 | | 2.56 | 88.9 |

TABLE III-continued

| Sample No. | Avg. Volume (ml) | Avg. Volume[b] (ml) | Avg. Sample Coating Wt (From Table II) | Post Popped Flaking (g) | Avg. Flaking (g) | Amt. Of Coating Remaining After Popping[c] (g) | Post Popped % Retention[d] |
|---|---|---|---|---|---|---|---|
| 5 |  | 2468.75 |  |  | 0.525 |  |  |
| 1 | 2400 |  | 2.88 | 0.07 |  | 2.81 | 97.6 |
| 2 | 2525 |  | 2.88 | 0.05 |  | 2.83 | 98.3 |
| 3 | 2450 |  | 2.88 | 0.04 |  | 2.84 | 98.6 |
| 4 | 2500 |  | 2.88 | 0.05 |  | 2.83 | 98.3 |
| 6 |  | 2287.5 |  |  |  |  |  |
| 1 | 2350 |  | 2.88 | 0.03 | 0.03 | 2.85 | 99.0 |
| 2 | 2200 |  | 2.88 | 0.02 |  | 2.86 | 99.3 |
| 3 | 2350 |  | 2.88 | 0.03 |  | 2.87 | 99.7 |
| 4 | 2250 |  | 2.88 | 0.04 |  | 2.86 | 99.3 |

[b] It is noted that there is an approximately 20% difference in the post-popped volume between, for example, sample 1 and 6. This is believed to be due to the following: (1) 6% decrease due to the weight displacement of glycerin, (i.e., a tests were conducted on a total weight basis of about 78 grams. Hence, the glycerin-coated kernels of sample 6 contained 6% glycerin which displaced an amount of coating or kernels which was present in sample 1; (2) 3.9% decrease due to increase d unpopped kernels in sample 6; and (3) 10.1% decrease due to compaction of the glycerin coated flakes.

[c] The amount of coating remaining after popping was calculated by subtracting the post-popped flaking amount from the average sample coating.

[d] Post-popped % Retention = $100 \times \frac{\text{Amount of Coating Remaining After Popping}}{\text{Average Sample Coating Wt}}$

What is claimed is:

1. A method for preparing an unpopped popcorn product; said method including the steps of:

(a) applying an aqueous-based adhesive composition onto kernels of unpopped popcorn;

(b) after said step of applying an aqueous-based adhesive composition, applying dry flavorant onto the kernels of unpopped popcorn kernels; and (c) after said step of applying dry flavorant onto the kernels of unpopped popcorn, applying a non-fat flowable flavorant facilitator to the kernels.

2. A method according to claim 1 wherein:

(a) said step of applying an aqueous-based adhesive composition comprises applying an adhesive composition containing no more than 15%, by weight, adhesive.

3. A method according to claim 1 wherein:

(a) said step of applying an aqueous-based adhesive comprises spraying an aqueous-based adhesive onto kernels of unpopped popcorn.

4. A method according to claim 1 wherein:

(a) said step of applying a flowable flavorant facilitator comprises spraying said flavorant facilitator onto coated kernels of unpopped popcorn.

5. A method according to claim 1 wherein:

(a) said flowable flavorant facilitator is a liquid at production temperature.

6. A method according to claim 1 wherein:

(a) the flowable flavorant facilitator is a liquid having a boiling point greater than 150° F.

7. A method according to claim 1 wherein:

(a) said flowable flavorant facilitator is glycerin.

8. A method according to claim 1 wherein:

(a) said step of applying an aqueous-based adhesive composition comprised of applying no more than 1.4%, by weight, adhesive composition per weight of kernels.

9. A method according to claim 1 including a step of:

(a) drying excess moisture from the kernels of unpopped popcorn after applying said dry flavorant and before applying said flowable flavorant facilitator.

10. An unpopped popcorn product made according to a process of:

(a) applying an aqueous-based adhesive composition onto kernels of unpopped popcorn;

(b) after said step of applying an aqueous-based adhesive composition, applying dry flavorant onto the kernels of unpopped popcorn; and (c) after said step of applying dry flavorant onto the kernels of unpopped popcorn, applying a non-fat flowable flavorant facilitator onto the coated kernels of unpopped popcorn.

11. An unpopped popcorn product according to claim 10 including:

(a) at least 2 g of salt per 100 g of unpopped kernels.

12. An unpopped popcorn product according to claim 10 wherein:

(a) said flowable flavorant facilitator is glycerin.

13. An unpopped popcorn product for microwave popping comprising:

(a) a package including a microwave interactive susceptor and a charge of unpopped popcorn kernels wherein said charge of unpopped popcorn comprises:

(i) aqueous-based adhesive and flavorant coated unpopped popcorn kernels; and (ii) a non-fat flowable flavorant facilitator covering said adhesive and flavorant coated unpopped popcorn kernels.

14. A method for popping an unpopped popcorn product, said method comprising:

(a) exposing a package of unpopped popcorn kernels to sufficient microwave energy to pop said unpopped popcorn kernels, said package of unpopped popcorn kernels comprising:

(i) unpopped popcorn kernels;

(ii) flavorant;

(iii) a non-fat flowable flavorant facilitator; wherein said package of unpopped popcorn kernels has no added fat.

15. A method according to claim 14 wherein (i) said unpopped popcorn kernels are coated with an aqueous-based adhesive and said flavorant; and (ii) said aqueous-based adhesive and flavorant coated unpopped popcorn kernels are covered with said flowable flavorant facilitator.

16. The method according to claim 15 wherein said flowable flavorant facilitator is glycerin applied at 0.5% to 1.0% of the weight of coated unpopped popcorn kernels.

17. The method according to claim 14 wherein said flowable flavorant facilitator is adhered to said unpopped popcorn kernels.

* * * * *

UNITED STATES PATENT AND TRADEMARK OFFICE
CERTIFICATE OF CORRECTION

PATENT NO. : 5,750,166

DATED : May 12, 1998

INVENTOR(S) : Steven R. Schellhaass

It is certified that error appears in the above-identified patent and that said Letters Patent is hereby corrected as shown below:

Col. 17, Table II, last line of footnote a, insert "78" before "gm".

Col. 19, Table III, second line of footnote b, "a" should be ---all---.

Signed and Sealed this

Sixth Day of July, 1999

Attest:

Q. TODD DICKINSON

*Attesting Officer*      *Acting Commissioner of Patents and Trademarks*